United States Patent
Zeh et al.

(10) Patent No.: US 11,100,229 B2
(45) Date of Patent: Aug. 24, 2021

(54) SECURE HYBRID BOOT SYSTEMS AND SECURE BOOT PROCEDURES FOR HYBRID SYSTEMS

(71) Applicant: Infineon Technologies AG, Neubiberg (DE)

(72) Inventors: Alexander Zeh, Munich (DE); Veit Kleeberger, Munich (DE); Berndt Gammel, Markt Schwaben (DE)

(73) Assignee: Infineon Technologies AG

( * ) Notice: Subject to any disclaimer, the term of this patent is extended or adjusted under 35 U.S.C. 154(b) by 227 days.

(21) Appl. No.: 16/515,633

(22) Filed: Jul. 18, 2019

(65) Prior Publication Data

US 2021/0019417 A1 Jan. 21, 2021

(51) Int. Cl.
*G06F 21/00* (2013.01)
*G06F 21/57* (2013.01)
*G06F 21/79* (2013.01)
*G06F 21/62* (2013.01)

(52) U.S. Cl.
CPC .......... *G06F 21/572* (2013.01); *G06F 21/575* (2013.01); *G06F 21/62* (2013.01); *G06F 21/79* (2013.01)

(58) Field of Classification Search
CPC ........ G06F 21/572; G06F 21/79; G06F 21/62; G06F 21/575; H04L 9/3247; H04L 9/3236; H04L 9/0643; H04L 9/0861
See application file for complete search history.

(56) References Cited

U.S. PATENT DOCUMENTS

| | | | |
|---|---|---|---|
| 9,288,056 B1 * | 3/2016 | Spagnola | H04L 9/3236 |
| 2003/0196096 A1 * | 10/2003 | Sutton | G06F 21/572 |
| | | | 713/181 |
| 2003/0216172 A1 * | 11/2003 | LeMay | G07F 17/32 |
| | | | 463/29 |
| 2004/0064457 A1 * | 4/2004 | Zimmer | G06F 21/575 |
| 2005/0278499 A1 * | 12/2005 | Durham | G06F 21/64 |
| | | | 711/173 |
| 2007/0220500 A1 * | 9/2007 | Saunier | G06F 21/575 |
| | | | 717/162 |

(Continued)

FOREIGN PATENT DOCUMENTS

| | | | | |
|---|---|---|---|---|
| CN | 1348130 A | * | 5/2002 | ........... H04L 63/123 |
| WO | WO-2008061028 A1 | * | 5/2008 | ........... H04L 67/101 |

*Primary Examiner* — John B King
(74) *Attorney, Agent, or Firm* — Design IP (57) ABSTRACT

A hybrid device includes a plurality of diverse subsystems, including a first and a second subsystem. The first subsystem includes at least one first secured storage device configured to store a first software and a first CPU configured to boot and execute the first software. The second subsystem includes at least one second secured storage device configured to store a second software and a second CPU configured to boot and execute the second software. The first CPU is configured to generate the first hash of the first software and transmit the generated first hash of the first software to the second subsystem. The second CPU is configured to perform a first authenticity validation check on the first software using the received first hash of the first software, and generate an error signal on a condition that the first authenticity validation check on the first software fails.

26 Claims, 2 Drawing Sheets

(56) References Cited

U.S. PATENT DOCUMENTS

| | | | | |
|---|---|---|---|---|
| 2008/0200225 A1* | 8/2008 | Walker | ............... | G07F 17/3241 |
| | | | | 463/7 |
| 2009/0113210 A1* | 4/2009 | Westerinen | ............ | G06F 21/51 |
| | | | | 713/187 |
| 2010/0281273 A1* | 11/2010 | Lee | ........................ | F04B 33/00 |
| | | | | 713/190 |
| 2012/0088470 A1* | 4/2012 | Raleigh | .................. | H04W 4/12 |
| | | | | 455/406 |
| 2013/0174220 A1* | 7/2013 | Berg | .................... | H04L 63/123 |
| | | | | 726/3 |
| 2015/0189509 A1* | 7/2015 | Sheikh | ................. | H04W 24/04 |
| | | | | 726/4 |
| 2015/0324588 A1* | 11/2015 | Locke | .................. | G06F 21/562 |
| | | | | 713/2 |
| 2017/0286665 A1* | 10/2017 | Miranda | ................ | G06F 21/72 |
| 2018/0253557 A1* | 9/2018 | Schilder | ................. | G06F 21/51 |
| 2020/0250344 A1* | 8/2020 | Rahn | ...................... | H04L 9/3247 |
| 2020/0382313 A1* | 12/2020 | Oguchi | ................ | H04L 9/3247 |

* cited by examiner

FIG. 3

SECURE HYBRID BOOT SYSTEMS AND SECURE BOOT PROCEDURES FOR HYBRID SYSTEMS

FIELD

The present disclosure relates generally to secure hybrid systems and to methods for operating the same.

BACKGROUND

Functional safety of electronic systems in automotive vehicles is an important topic in the light of increasing automation and semiconductor content of modern vehicles. It is desirable to have a reliable and safe functionality for the safety critical parts deployed in the system.

In addition to functional safety, cybersecurity has become an important aspect in vehicle electronics systems. It is inevitable to include both functional safety and automotive cybersecurity from the beginning of an electronic product design. Functional safety has reached a level of maturity, but cybersecurity is relatively new. Security parts may soon be required to be both safe and secure.

Secure booting procedures are important in automotive electronics whose functionalities are defined to a large extent over software (SW). Such software should be well protected from modification so that the intended functionality from the supplier is ensured and introduction of malicious software is prevented. Hybrid systems are systems that consist of at least two diverse types of subsystems, which can, for example, consist of different central processing units (CPUs), memory, and bus systems. The effectiveness of a secure boot procedure is directly dependent on the portion of the system which has to be compromised to introduce a different functionality. The higher the number of parts that have to be compromised or disturbed in a certain sequence, the higher the likelihood of successful introduction of a malicious piece of software.

Therefore, an improved system capable of performing hybrid boot procedures with a higher security may be desirable.

SUMMARY

Embodiments relate to hybrid systems and to secure boot procedures for hybrid systems. A hybrid system is a system that has at least two diverse types of subsystems, which can, for example, consist of different central processing units (CPUs), memory, and/or bus systems.

One or more embodiments provide a hybrid device that includes a plurality of diverse subsystems, including a first subsystem and a second subsystem. The first subsystem comprises at least one first secured storage device configured to store a first software and a first central processing unit (CPU) configured to boot and execute the first software. The second subsystem comprises at least one second secured storage device configured to store a second software and a second CPU configured to boot and execute the second software. The at least one first secured storage device is further configured to store a first secret key and a first stored signature corresponding to a first hash of the first software. The at least one second secured storage device is further configured to store a second secret key, a second stored signature corresponding to the first hash of the first software, and a third stored signature corresponding to a first hash of the second software. The first CPU is configured to generate the first hash of the first software and transmit the generated first hash of the first software to the second subsystem. The second CPU is configured to perform a first authenticity validation check on the first software using the received first hash of the first software, and generate an error signal on a condition that the first authenticity validation check on the first software fails.

One or more embodiments provide a method of performing a secure execution procedure for a hybrid device including a plurality of diverse subsystems, including a first subsystem that boots and executes a first software stored in at least one first secured storage device and a second subsystem that boots and executes a second software stored in a second secured storage device, wherein a first secret key and a first stored signature corresponding to a first hash of the first software are stored in the at least one first secured storage, and wherein a second secret key, a second stored signature corresponding to the first hash of the first software, and a third stored signature corresponding to a first hash of the second software are stored in the at least one second secured storage device. The method includes generating, by the first subsystem, the first hash of the first software; transmitting, by the first subsystem, the generated first hash of the first software to the second subsystem; performing, by the second subsystem, a first authenticity validation check on the first software using the received first hash of the first software; and generating, by the second subsystem, an error signal on a condition that the first authenticity validation check on the first software fails.

BRIEF DESCRIPTION OF THE DRAWINGS

Embodiments are described herein making reference to the appended drawings.

DETAILED DESCRIPTION

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. For example, variations or modifications described with respect to one of the embodiments may also be applicable to other embodiments unless noted to the contrary. Optional elements or elements that are capable of being activated and deactivated may be illustrated via the use of dashed lines and blocks in the figures.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

It will be appreciated that the terms "microprocessors", "processors", "processor cores", "processing units", and "processing circuitry" may be used interchangeably throughout this disclosure. A processor may include dedicated hardware for processing, storing, and/or distributing data and information. Two or more processors may also be combined to perform a processing function and may be regarded as a processor.

Embodiments relate to hybrid systems and to secure boot procedures for hybrid systems. A hybrid system is a system that has at least two diverse types of subsystems, which can, for example, consist of a different central processing units (CPUs), memory, and bus systems. A CPU is generally defined as a device for software (computer program) execution. In secure systems, a CPU may be configured to interface with software that is stored in a secure storage module such a secure memory device. More particular, the CPU may execute the instructions constituting the secure software program. As will be described in more detail below, a hybrid system may include two or more domains, each including its own subsystem (e.g., each domain including its own CPU, secure storage module, and software).

A logic block may include one or more processors and/or other logic circuitry configured to receive and process one or more inputs to generate an output. In particular, a logic block may be any computational device such as a processor, a CPU, a cryptographic engine, a computing system, or the like.

Embodiments relate to Electronic Control Units (ECUs) and vehicle communication networks (e.g., Controller Area Networks (CANs), CAN with Flexible Data-Rate (CAN FD), Ethernet (ETH), Peripheral Component Interconnect Express (PCIe), or another bus standard). An ECU is any embedded system in automotive electronics that controls one or more of the electrical systems or subsystems in a vehicle. Each ECU includes a microcontroller (i.e., a microcontroller unit (MCU)), a memory, various inputs (e.g., supply voltage, digital inputs, and/or analog inputs) and outputs (e.g., relay drivers, H bridge drivers, injector drivers, and/or logic outputs), and communication links. Thus, the ECUs are the nodes of in-vehicle automotive networks, while the edges of those networks are communication networks (e.g., CAN, CAN FD, ETH, PCIe, etc.).

A non-exhaustive list of ECU types includes an Electronic Control Unit, an Engine Control Module (ECM), an Engine Control Unit, a Transmission Control Unit (TCU), a Transmission Control Module (TCM), a Brake Control Module (BCM or EBCM), a Central Control Module (CCM), a Central Timing Module (CTM), a General Electronic Module (GEM), a Body Control Module (BCM), a Suspension Control Module (SCM), a Door Control Unit (DCU), an Electric Power Steering Control Unit (PSCU), a Human-Machine Interface (HMI), a Seat Control Unit, a Speed Control Unit (SCU), a Telematic Control Unit (TCU), and a Battery Management System (BMS). Sometimes the functions of the Engine Control Unit and the TCU are combined into a single ECU called a Powertrain Control Module (PCM). In addition, the BCM may be configured to control an anti-lock braking system (ABS), electronic stability control (ESC), and/or dynamic stability control (DSC).

Embodiments further relate to cryptographic hash values and digital signatures used to verify an authenticity of software. A cryptographic hash function or hashing algorithm is any function or mathematical algorithm that can be used to map data of arbitrary size to data of a fixed size (i.e., to generate a hash). The hash is a fixed-length string of numbers and/or letters generated from the mathematical algorithm and the arbitrarily sized message, such as an email, document, picture, software, or other type of data. The values returned by the hash function are called hash values, hash codes, digests, or simply hashes. A hash function is deterministic so that the same input always results in the same hash. This means the generated string is unique to the file being hashed and is a one-way function making it infeasible to find two different inputs with the same hash value. Hash values can vary in length. Generally, a stronger hash function generates a longer the hash value, and, the longer the hash value, the more secure or stronger the hash value is. However, typically the computational load is more intensive for stronger hash values, resulting in longer processing times. In other words, a stronger hash has less collision probability and therefore also longer computational running time when compared to a weaker hash.

Hashing algorithms commonly used include SHA-1, SHA-2 and SHA-3, but embodiments described herein are not limited thereto. Hashing may be used in any instance where a value is being compared with a stored value, but cannot store its plain representation for security reasons.

For example, when a secure message is transmitted, a hash of the intended message is generated and encrypted, and is sent along with the message. When the message is received, the receiver decrypts the hash as well as the message. Then, the receiver creates another hash from the decrypted message. If the two hashes are identical when compared, then a secure transmission has occurred. Both the transmitter and the receiver must use the same hash function or algorithm. In some cases, the transmitter may send the receiver the algorithm along with the hash value of the message. This hashing process ensures that the message is not altered by an unauthorized end user. Thus, the purpose of hashing is to verify the authenticity of the transmitted message, but it may also be used for authentication if a key is used.

A digital signature refers to a set of algorithms and encryption protections used to validate the authenticity of a message, software, or digital document. Digital signatures work by proving that a digital message, software, or document was not modified—intentionally or unintentionally—from the time it was signed. Digital signatures do this by generating a unique hash of the message or document and encrypting it using the sender's private key. The hash generated is unique to the message, software, or document, and changing any part of it will completely change the hash.

Once completed, the message or digital document is digitally signed and sent to the recipient. The recipient then generates their own hash of the message or digital document and decrypts the sender's hash (included in the original message) using the sender's public key. The recipient compares the hash they generate against the sender's decrypted hash; if they match, the message or digital document has not been modified and the sender is authenticated.

The general notation H=HASH(X) represents a hash value H obtained by hashing data X via hash function/algorithm HASH. For example, $X_A$=HASH-A(SW-A) represents a hash value $X_A$ obtained by hashing software A (SW-A) via a hash function/algorithm HASH-A. $X_B$=HASH-B(SW-B) represents a hash value $X_B$ obtained by hashing software B (SW-B) via a hash function/algorithm HASH-B. $X^*_A$=HASH-B(SW-A) represents a hash value $X^*_A$ obtained by hashing software A (SW-A) via a hash function/algorithm HASH-B. A double equal sign "==" represents a compare function. For example, two hash values generated by two different sources may be compared (e.g., $X_A$==$X_A$).

Similarly, the general notation S=SIGN$_K$(X) represents a signature S obtained by signing of hash value X using a key k via sign function/algorithm SIGN. For example, $SA_1$=SIGN-$A_{K1}$($X_A$) represents a signature $SA_1$ obtained by signing hash value $X_A$ using key K1 via sign function/algorithm SIGN-A. $SA_2$=SIGN-$B_{K2}$($X_A$) represents a signature $SA_2$ obtained by signing hash value $X_A$ using key K2 via sign function/algorithm SIGN-B. $SB_1$=SIGN-$A_{K1}$($X_B$) represents a signature $SB_1$ obtained by signing hash value $X_B$ using key K1 via sign function/algorithm SIGN-A. $SB_2$=SIGN-$B_{K2}$($X_B$) represents a signature $SB_2$ obtained by signing hash value $X_B$ using key K2 via sign function/algorithm SIGN-B. $SA^*_1$=SIGN-$A_{K1}$($X^*_A$) represents a signature $SA^*_1$ obtained by signing hash value $X^*_A$ using key K1 via sign function/algorithm SIGN-A. $SA^*_2$=SIGN-$B_{K2}$($X^*_A$) represents a signature $SA^*_2$ obtained by signing hash value $X^*_A$ using key K2 via sign function/algorithm SIGN-B. A double equal sign "==" represents a compare function. For example, two signatures generated by two different sources may be compared (e.g., SIGN-$A_{K1}$($X_A$)==$SA_1$).

Figure 1:
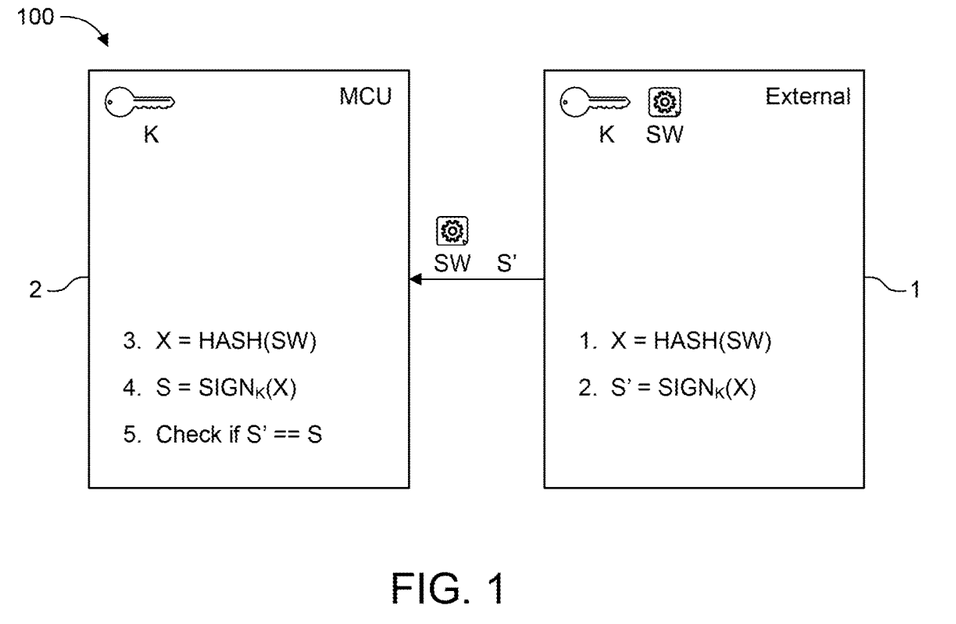
FIG. 1 is a block diagram of a secure boot system according to one or more embodiments.

FIG. 1 is a block diagram of a secure boot system 100 according to one or more embodiments. The secure boot system includes an external device 1 and a microcontroller unit (MCU) 2, each of which store a common secret key K. Additionally, the external device 1 initially stores software SW for loading onto the MCU 2. Initially, the software SW is signed externally by the external device 1 by first generating a hash X of the software SW (i.e., X=HASH(SW) and then generating a signature S' of the hash X (i.e., S'=SIGN$_K$(X)). Then, the software SW and the signature S' is transferred from the external device 1 to the MCU 2. In order to perform a secure boot operation of the software, the MCU 2 first checks the authenticity of the software SW prior to execution of the boot operation and ultimately prior to executing the software SW itself. To check the authenticity of the software SW, the MCU 2 generates its own hash of the software SW and then calculates the signature S. Finally, the signature S is compared with the stored signature S' (i.e., S==S'). If the two signatures are the same, the MCU 2 proceeds with the boot operation of the software SW. If the two signatures are different, the boot operation is interrupted, and an error is generated.

Traditional secure boot procedures in automotive systems are fully sequential, where the boot software is checked before execution. With increasing amount of authentication this becomes a bottleneck as startup timing for automotive is highly constrained and several other tasks (e.g., test of mission mode logic) have to executed prior to executing the software.

Figure 2:
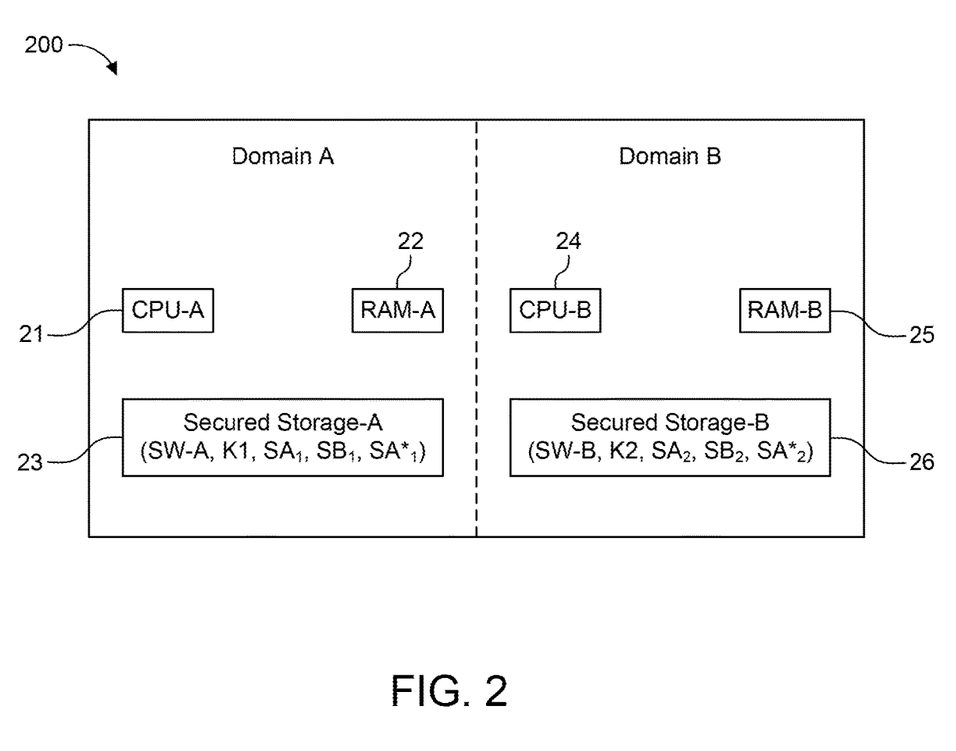
FIG. 2 is a block diagram of a hybrid system that implements a secure hybrid boot procedure according to one or more examples.

FIG. 2 is a block diagram of a hybrid system 200 that implements a secure hybrid boot procedure according to one or more examples. The hybrid system 200 includes at least two distinct domains (i.e., subsystems), Domain A and Domain B, where each domain is configured to perform different types of computing tasks. That is, Domain A and Domain B represent two diverse types of subsystems in which at least one of their CPUs, memory devices (non-volatile and volatile), and/or bus systems is different from the other.

For example, Domain A may be configured to perform real-time computing tasks that are required to be performed quickly and on demand. As a result, Domain A may serve as a real-time control module and be referred to as a real-time domain. For example, Domain A may be configured to perform tasks corresponding to safety-related tasks. In a vehicle environment, safety-related tasks are critical to maintaining a safe operation of the vehicle and responding quickly to changing environmental conditions and factors. Thus, it is important that Domain A's is capable of performing execution of its software in a real-time manner.

In contrast, Domain B may be configured to perform computational intensive algorithms or other tasks that require a high degree of computing power. As a result, Domain B may serve as a performance computation module or an application core, and be referred to as a computational domain. Here, it may not be as critical that tasks be performed in real-time. In a vehicle environment, these tasks may be related to infotainment processing, image data processing, and so forth. Alternatively, Domain B may serve to supplement Domain A by providing additional computational bandwidth. For example, Domain B may supply performance addons to the real-time part of Domain A.

Each domain includes its own CPU, random-access memory (RAM) that stores data and machine code currently being used by the CPU, and a secured storage device that securely stores software to be executed by the corresponding CPU. Thus, Domain A includes a CPU-A 21, RAM-A 22, and secured storage-A 23 that securely stores software SW-A, signatures, and cryptographic keys (e.g., secret keys). Similarly, Domain B includes a CPU-B 24, RAM-B 25, and secured storage-A 26 that securely stores software SW-B, signatures, and cryptographic keys (e.g., secret keys), where software SW-A and software SW-B are diverse pieces of software (i.e., they are different from each other).

An external device, such as external device 2, may be configured to distribute, load, or share respective software, secret keys, and signatures to a respective domain (e.g., to a respective secured storage device).

For example, the external device may share a secret key K1 with Domain A and may share a secret key K2 with Domain B. Each secret key K1 and K2 may be stored, encrypted, in embedded flash, fuses, or external NOR- or NAND flash. For example, Domain A may use embedded flash or fuses to store its key (e.g., key K1), whereas Domain B may use external NOR- or NAND flash to store its key (e.g., key K2). The secret keys K1 and K2 may have different key lengths such that the "security level" and the performance required an be variable between the two domains. For example, in the examples presented herein, secret key K2 may have a longer key length than secret key K1.

When a respective domain requires access to its secret key, the secret key may be loaded into a dedicated crypto module. It is noted that the dedicated crypto module of Domain A may be diverse from the dedicated crypto module of Domain B. For example, the dedicated crypto module of Domain A may be an Advanced Encryption Standard (AES) crypto module, whereas the dedicated crypto module of Domain B may be a Salsa20 crypto module, a ChaCha crypto module, or the like.

In addition, the external device calculates various hashes and signatures, and transfers software SW-A and signatures $SA_1$, $SA^*_1$, and $SB_1$ to Domain A. Similarly, the external device calculates various hashes and signatures, and transfers software SW-B and signatures $SB_2$, $SA_2$, and $SA^*_2$ to Domain B. In order to calculate the signatures, the external device must know the corresponding hashing algorithms and signature algorithms.

Software SW-A may be stored in embedded flash and may have a hard boot time constraint due to ECU registration in a vehicle onboard network. In contrast, software SW-B may be stored, encrypted, in external flash and may not have any boot time constraint or may have a soft boot time constraint due to late required availability during system startup. Thus, software SW-B may be booted from external flash, which needs to be encrypted for security purposes.

Furthermore, to further diversify Domain A and Domain B, both domains may use diverse hashing algorithms (e.g., HASH-A or HASH-B, respectively) and diverse signature algorithms (e.g., SIGN-A or SIGN-B, respectively).

Figure 3:
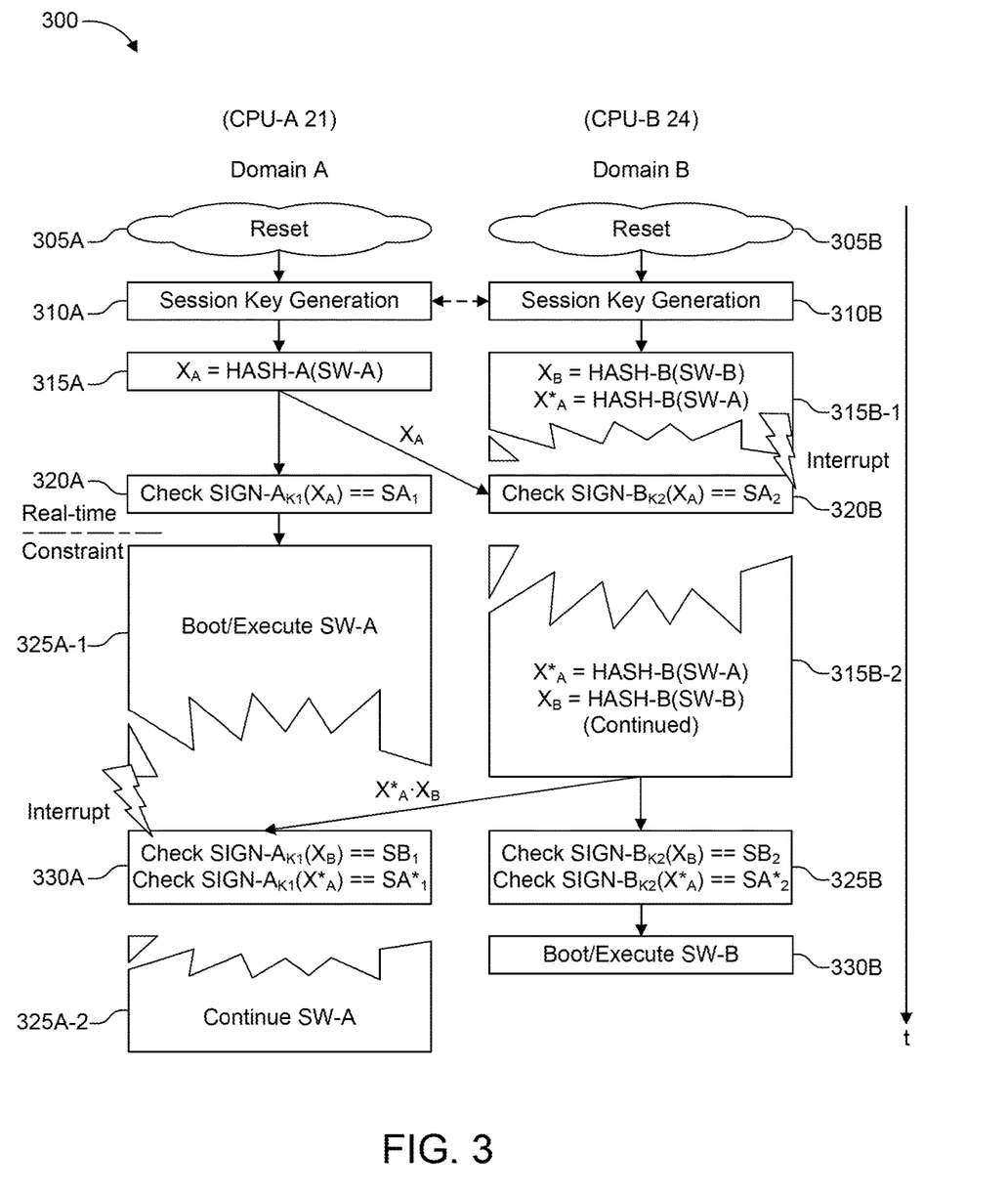
FIG. 3 is a flow diagram of a secure hybrid boot procedure implemented in a hybrid device according to one or more embodiments.

FIG. 3 is a flow diagram of a secure hybrid boot procedure 300 implemented in a hybrid device according to one or more embodiments. In particular, the flow diagram shows respective actions taken by Domain A and Domain B during the secure hybrid boot procedure (i.e., over time t) that includes the booting of software SW-A and SW-B. Broken lines are used to indicate locations where a boot operation of software or an execution operation of software is interrupted in order to perform an authenticity verification operation.

Each authenticity verification operation may result in the authenticity of software being verified (i.e., approved) or found faulty. In the latter case, an error may be detected and a boot or execution interrupt may be generated that stops the boot or execution process in the respective domain, and/or is used to issue a warning to a user of possible tampering or corruption of the software.

The secure hybrid boot procedure 300 starts both domains in parallel. For example, both domains may be reset in operations 305A and 305B, respectively, at a start of a vehicle driving cycle (i.e., at a time a vehicle is started). In operations 310A and 310B, the two domains exchange session keys that are used for secure communications between the two domains. Thus, all exchanges (i.e., communications) across domains are protected by the session-key and timestamps to prevent replay and man-in-the-middle (MITM) attacks. That is, the two domains exchange information only via secured communication.

In operations 315A and 320A, the CPU 21 of Domain A is configured to perform an authenticity verification operation on software SW-A to meet a rea-time constrain of booting and executing software SW-A. Thus, in operation 315A, the CPU 21 of Domain A calculates the hash $X_A$ of software SW-A using hashing algorithm HASH-A. CPU 21/Domain A also sends a communication to Domain B that includes hash $X_A$, and Domain B stores the hash $X_A$ in secured storage B 26 or RAM-B 25 (see operation 320B).

In operation 320A, CPU 21 calculates the signature of hash $X_A$ using signature algorithm SIGN-A and secret key K1, and checks the authenticity of software SW-A by comparing the calculated signature with the stored signature $SA_1$. If the two signatures match, then CPU 21 continues to boot and execute software SW-A in operation 325A-1. If the two signature have a mismatch, the CPU 21 generates an error.

By performing an initial authenticity verification operation, the CPU 21 performs its own software verification so that the critical functionality of software SW-A can proceed to execution as quickly as possible to bring real-time-(e.g., safety) critical functionalities online. Meanwhile, the CPU 24 of Domain B is also configured to perform an authenticity verification operation on software SW-A in parallel.

In operation 315B-1, as part of an authenticity verification operation of software SW-B, the CPU 24 of Domain B is configured to calculate the hash $X_B$ of software SW-B using hashing algorithm HASH-B to be used in its own authenticity verification operation. Additionally, CPU 24 may have access to software SW-A at storage 23 and therefore may calculate the corresponding Hash $X^*_A$ using hashing algorithm HASH-B. However, this authenticity verification operation is interrupted upon receipt of hash $X_A$ from Domain A to order to perform a second authenticity verification operation on software SW-A.

In operation 320B, the CPU 24 is configured to perform a second authenticity verification operation on software SW-A using hashing algorithm HASH-B. The hashing algorithm HASH-B may be a stronger hash function than hashing algorithm HASH-A. Thus, by using the hashing algorithm HASH-B, Domain B provides a diverse authenticity check on software SW-A that is more robust against attacks than hashing algorithm HASH-A. The trade-off is that a stronger hash function requires more time to generate and verify. Thus, Domain A uses a less secure hashing function that requires less processing time in order to meet its real-time constraint. In contrast, Domain B, which does not have meet the real-time constraint of Domain A, has sufficient time and processing bandwidth to engage with a stronger hash function.

In other words, CPU 21 is required to boot software SW-A within a time constraint such that, for example, safety-critical functionalities are brought online to meet a real-time constraint. In contrast, CPU 24 is configured to boot software SW-B without any time constraint or a lower time constraint compared to software SW-A. This allows CPU 24 to interrupt the boot operation of its own software to perform the authentication check on software of CPU 21, which has a high priority in terms of functionality to the overall system (e.g., the overall vehicle system). Once CPU 24 completes the authentication check on software SW-A, it resumes the boot operation of software SW-B.

Turing back to operation 320B, the CPU 24 receives the hash $X_A$ from Domain A, calculates the signature of hash $X_A$ using signature algorithm SIGN-B and secret key K2, and checks the authenticity of software SW-A by comparing the calculated signature with the stored signature $SA_2$. If the two signatures match, then CPU 24 does not generate an error and CPU 21 continues with the execution of software SW-A without incident. On the other hand, if there is a mismatch between the two signatures, CPU 24 generates an error and notifies Domain A. It is noted that secret key K2 may have a longer key length than secret key K1 in order to provide a higher security level. As such, longer processing times associated with longer key lengths can be more readily absorbed by CPU 24 due to a lack of a real-time constraint on the boot of software SW-B when compared with CPU 21 and software SW-A, which does have a real-time constraint on the boot time thereof.

After CPU 24 performs a second authenticity verification operation on software SW-A in operation 320B, the authenticity verification operation of software SW-B continues in operation 315B-2. Thus, if CPU 24 was unable to complete the generation of hashes $X_B$ and $X^*_A$ (if required), CPU 24 completes generating the hashes in operation 315B-2 and then proceeds to operation 325B. In addition, CPU 24 may be configured to transmit hashes $X_B$ and $X^*A$ to Domain A for an additional authenticity verification operation (see operation 330A).

In operation 325B, CPU 24 of Domain B continues to perform the authenticity verification operation on software SW-B by calculating the signature of hash $X_B$ using signature algorithm SIGN-B and secret key K2, and checking the authenticity of software SW-B by comparing the calculated signature with the stored signature $SB_2$. If the two signatures match, then CPU 24 continues to boot and execute software SW-B in operation 330B. If the two signature have a mismatch, the CPU 24 generates an error.

In addition, in operation 325B, CPU 24 may perform an additional (i.e., third) authenticity verification operation on software SW-A by calculating the signature of hash $X^*_A$ using signature algorithm SIGN-B and secret key K2, and checking the authenticity of software SW-A by comparing the calculated signature with the stored signature $SA^*_2$. If the two signatures match, no error is generated and Domain A continues with the status quo. However, if the two signature have a mismatch, the CPU 24 generates an error and may notify Domain A.

Turning back to Domain A, in operation 330A, the CPU 21 performs a second authenticity verification operation on software SW-B in response to receiving the hash $X_B$ from Domain B. In order to perform this check, CPU 21 interrupts the execution of software SW-A. In response to receiving hash $X_B$, CPU 21 calculates the signature of hash $X_B$ using signature algorithm SIGN-A and secret key K1, and checks the authenticity of software SW-B by comparing the calculated signature with the stored signature $SB_1$. If the two signatures match, then CPU 21 does not generate an error and CPU 24 continues with the execution of software SW-B without incident. On the other hand, if there is a mismatch between the two signatures, CPU 21 generates an error and notifies Domain B.

In addition, CPU 21 may perform an additional (i.e., fourth) authenticity verification operation on software SW-A by calculating the signature of hash $X^*_A$ using signature algorithm SIGN-A and secret key K1, and checking the authenticity of software SW-A by comparing the calculated signature with the stored signature $SA^*_1$. If the two signatures match, no error is generated and Domain A continues with execution of software SW-2 in operation 325A-2. However, if the two signature have a mismatch, CPU 21 generates an error.

In view of the above, both domains are responsible for performing an authenticity verification operation on their own respective software. In addition, at least one of the domains is configured to perform an authenticity verification operation on the software of the other domain.

Additional variants are also possible. It may be required that both Domains A and B are configured to acknowledge the authenticity of the hashes (e.g., $SA_1$ and $SA_2$ in case of Domain A). For example, Domain A checks hash $X_A$ with signature $SA_1$ and Domain B checks hash $X_A$ with signature $SA_2$. Additionally or alternatively, Domain B may check hash $X^*_A$ with signature $SA^*_2$. It will be appreciated that Domain A may similarly perform checks on hash $X_B$ for Domain B, as described above.

This may be referred to as a "security mode" due to the diverse authenticity check. This includes a diversity in hash computation, where Domains A and B compute a hash for domain A (i.e., for software SW-A). Domain A uses faster but weaker hash ($X_A$), while Domain B uses a stronger but slower hash ($X^*_A$). Thus, this enables a fast boot start of domain A with basic authenticity, which is supplemented by a high authenticity by the diverse hash $X^*_A$ computed from domain B. In general, security mode pertains to a configuration when a domain's software is checked at least twice, including by its own domain and at least one cross-check by at least one other domain. There may also be varying levels of security modes, where a higher security mode includes a higher number of authenticity verification operations or authenticity checks performed on a domain, or on two or more domains.

In another variant, only one domain (A or B) is required to acknowledge the authenticity of software SW-A and only one domain (A or B) is required to acknowledge the authenticity of software SW-B. This may be referred to as "fail operational mode" and enables an increased availability in case of, for example, random hardware faults. Thus, in one variant of a fail operation mode, Domain A and B may boot separately without checking each other.

A combination of different modes or variants may be used during a driving cycle of a vehicle, where a driving cycle is defined by a period from a time a vehicle is turned on to a time it is turned off. For example, a security mode may be implemented at cold power on (i.e., at first startup of the vehicle) and a fail operational mode or a lower security mode may be used after the initial startup phase or after the system has been running for a predetermined amount of time. Alternatively, different modes can be randomly selected at startup.

A monitoring function of a first domain on a second domain (i.e., the first domain monitoring the second domain) may run in certain constant or randomized intervals.

In addition, implementation of monitoring mechanism in parallel to hash computation is provided in which one domain may be configured to monitor the hash computation of the other domain to ensure it is in fact the monitored domain that has generated the hash of respective software SW-X. This is of interest to prevent a situation where the monitored domain presents an "made up value" as the hash value for its respective software SW-X. For example, CPU 24 may be configured to monitor a hash generating operation of hash $X_A$ to ensure CPU 21 actually generated hash $X_A$ or detect that an incorrect hash was generated by CPU 21 or injected by an attacker.

For instance, at least one hash generating parameter or metric may be monitored by CPU 24 that corresponds to the generation of hash $X_A$ by Domain A. Monitored parameters or metrics can include: passed execution time (e.g., based on a common time base), current CPU state (e.g., program counter values), authenticity of hash computation function, and/or authenticity of CPU configuration (e.g., interrupt configuration, debug system configuration), one or more of which may be unique to the generation of hash $X_A$ by Domain A.

Thus, upon receipt of hash $X_A$ (see e.g., operation 320B in FIG. 3), CPU 24 may verify whether hash $X_A$ was generated by CPU 21 by comparing each of the one or more monitored parameters or metrics of Domain A with a corresponding predetermined parameter or metric. Should there be a match, then CPU 24 confirms that hash $X_A$ was generated by CPU 21. However, should there be a mismatch in any one of the monitored parameters or metrics, CPU 24 flag the received hash $X_A$ as erroneous and issue a warning.

Monitoring Domain B by Domain A may be performed in a similar manner for any hash generated by CPU 24.

Several prevention attack scenarios exist. For example, the following are examples of attack scenarios for Domain A, which can also be applied to other domains and may also be used in any combination with each other.

In a first attack scenario, Domain A is compromised, Domain A's own secure boot is not circumvented, and Domain B indicates the fault (i.e., the attack) after determining the error.

In a second attack scenario, Domain A is compromised, Domain A's own secure boot is circumvented, and domain A does not send its hash value as expected.

In a third attack scenario, Domain A is compromised, Domain A's own secure boot is circumvented, and Domain A sends the wrong hash value, which is detected by Domain B.

In a fourth attack scenario, Domain A's signature algorithm is broken (unsecure), and a fallback mechanism is provided over still secure signature algorithm of Domain B.

In a fifth attack scenario, due to a random safety fault security check of Domain A by Domain B, Domain A is determined not to be working properly. Thus, an attack may be prevented by a redundant security check in Domain B.

In a sixth attack scenario, one domain is compromised, and the execution of malicious software has different characteristics which can be recognized over monitoring function (e.g., runtime, memory, . . . ) of the other domain.

In a seventh attack scenario, communication between Domain A and B is disturbed by a "third party" (e.g., overloading bus, . . . ) which can be recognized by, for example, time monitoring.

In an eight attack scenario, side channel attacks (e.g., glitches), which are introduced into one domain leading to anomalous behavior, can be recognized over a monitoring function (e.g., runtime, memory) by another domain.

Although embodiments described herein relate to vehicle systems, it is to be understood that the concepts described herein may similarly be extended to any hybrid system that uses at least two diverse types of subsystems in which a secure boot procedure is desirable.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware and/or in software. The implementation can be performed using a computer readable, digital storage medium, for example a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed.

Instructions may be executed by one or more processors, such as one or more central processing units (CPU), digital signal processors (DSPs), general purpose microprocessors, application specific integrated circuits (ASICs), field programmable gate (or logic) arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A hybrid device, comprising:
a plurality of diverse subsystems, including a first subsystem and a second subsystem,
wherein the first subsystem comprises at least one first secured storage device configured to store a first software and a first central processing unit (CPU) configured to boot and execute the first software,
wherein the second subsystem comprises at least one second secured storage device configured to store a second software, and a second CPU configured to boot and execute the second software,
wherein the at least one first secured storage device is further configured to store a first secret key and a first stored signature corresponding to a first hash of the first software,
wherein the at least one second secured storage device is further configured to store a second secret key, a second stored signature corresponding to the first hash of the first software, and a third stored signature corresponding to a first hash of the second software,
wherein the first CPU is configured to generate the first hash of the first software and transmit the generated first hash of the first software to the second subsystem, and
wherein the second CPU is configured to perform a first authenticity validation check on the first software using the received first hash of the first software, and generate an error signal on a condition that the first authenticity validation check on the first software fails.

2. The hybrid device of claim 1, wherein the first CPU is configured to boot the first software within a time constraint.

3. The hybrid device of claim 2, wherein and the second CPU is configured to boot the second software without any time constraint.

4. The hybrid device of claim 1, wherein the second CPU is configured to monitor a hash generating operation of the first subsystem and verify that the first CPU generated the first hash, based on monitoring at least one hash generating parameter of the first subsystem.

5. The hybrid device of claim 1, wherein the first CPU and the second CPU are configured to exchange session keys and communicate via secured communication using the exchanged session keys.

6. The hybrid device of claim 1, wherein:
the first CPU is configured to generate the first hash of the first software by applying a first hash function to the first software,
the second CPU is configured to perform the first authenticity validation check by generating a generated signature corresponding to the received first hash of the first software, comparing the generated signature with the second stored signature to generate a comparison result, and verifying an authenticity of the first software based on the comparison result.

7. The hybrid device of claim 6, wherein:
the first CPU is configured to apply a first hash function and a first signature algorithm to generate hashes and signatures in the first subsystem, respectively,
the second CPU is configured to apply a second hash function and a second signature algorithm to generate hashes and signatures in the second subsystem, respectively,
the first hash function and the second hash function are different, the first signature algorithm and the second signature algorithm are different, and a first key length of the first secret key is different from a second key length of the second secret key, and
the second CPU is configured to generate the generated signature corresponding to the received first hash of the first software using the second signature algorithm and the second secret key.

8. The hybrid device of claim 1, wherein the first CPU is configured to perform a second authenticity validation check on the first software by generating a generated signature corresponding to the generated first hash of the first software, comparing the generated signature with the first stored signature to generate a comparison result, and verifying an authenticity of the first software based on the comparison result.

9. The hybrid device of claim 1, wherein the second CPU is configured to generate the first hash of the of the second software and perform a first authenticity validation check on the second software by generating a generated signature corresponding to the generated first hash of the second software, comparing the generated signature with the third stored signature to generate a comparison result, and verifying an authenticity of the second software based on the comparison result.

10. The hybrid device of claim 1, wherein:
the first CPU is configured to apply a first hash function and a first signature algorithm to generate hashes and signatures in the first subsystem, respectively,
the second CPU is configured to apply a second hash function and a second signature algorithm to generate hashes and signatures in the second subsystem, respectively, and
the first hash function and the second hash function are different, and the first signature algorithm and the second signature algorithm are different.

11. The hybrid device of claim 10, wherein:
the first CPU is configured to perform a second authenticity validation check on the first software by generating a first generated signature corresponding to the generated first hash of the first software using the first signature algorithm and the first secret key, comparing the first generated signature with the first stored signature to generate a first comparison result, and verifying an authenticity of the first software based on the first comparison result,
the second CPU is configured to perform the first authenticity validation check on the first software by generating a second generated signature corresponding to the received first hash of the first software using the second signature algorithm and the second secret key, comparing the second generated signature with the second stored signature to generate a second comparison result, and verifying an authenticity of the first software based on the second comparison result.

12. The hybrid device of claim 11, wherein the second hash function is stronger than the first hash function.

13. The hybrid device of claim 11, wherein the second CPU is configured to perform the first authenticity validation check while the first CPU executes the first software.

14. The hybrid device of claim 11, wherein the second CPU is configured to generate the first hash of the of the second software and perform a first authenticity validation check on the second software by generating a third generated signature corresponding to the generated first hash of the second software using the second signature algorithm and the second secret key, comparing the third generated signature with the third stored signature to generate a third comparison result, and verifying an authenticity of the second software based on the third comparison result.

15. The hybrid device of claim 1, wherein:
the second CPU is configured to generate the first hash of the of the second software and transmit the generated first hash of the second software to the first subsystem, and
the first CPU is configured to perform a first authenticity validation check on the second software using the received first hash of the second software, and generate an error signal on a condition that the first authenticity validation on the second software check fails.

16. The hybrid device of claim 1, wherein:
the first stored signature is derived from a first signature algorithm using the first secret key and the first hash of the first software,
the first hash of the first software is derived from a first hash function and the first software,
the second stored signature is derived from a second signature algorithm using the second secret key and the first hash of the first software,
the third stored signature is derived from the second signature algorithm using the second secret key and the first hash of the second software,
the first hash of the second software is derived from a second hash function and the second software,
wherein the first secret key and the second secret key have different key lengths, the first hash function and the second hash function are different, and the first signature algorithm and the second signature algorithm are different.

17. The hybrid device of claim 16, wherein:
the at least one first secured storage device is further configured to store a fourth stored signature corresponding to the first hash of the second software,
the fourth signature is derived from the first signature algorithm using the first secret key and the first hash of the second software, and
the first hash of the second software is derived from the second hash function and the second software.

18. The hybrid device of claim 17, wherein:
the second CPU is configured to generate the first hash of the second software and transmit the generated first hash of the second software to the first subsystem, and
the first CPU is configured to perform a first authenticity validation check on the second software by using the received first hash of the second software to generate a fourth generated signature, comparing the fourth generated signature with the fourth stored signature to generate a comparison result, and verifying the authenticity of the second software based on the comparison result.

19. The hybrid device of claim 17, wherein:
the at least one second secured storage device is further configured to store a fifth stored signature corresponding to a second hash of the first software, the fifth stored signature is derived from the second signature algorithm using the second secret key and the second hash of the first software, and the second hash of the first software is derived from the second hash function and the first software.

20. The hybrid device of claim 19, wherein:

the second CPU is configured to access the first software from the at least one first secured storage device, generate the second hash of the first software based on the accessed first software, and perform a second authenticity validation check on the first software by generating a fifth generated signature corresponding to the generated second hash of the first software using the second signature algorithm and the second secret key, comparing the fifth generated signature with the fifth stored signature to generate a comparison result, and verifying an authenticity of the first software based on the comparison result.

21. A method of performing a secure execution procedure for a hybrid device including a plurality of diverse subsystems, including a first subsystem that boots and executes a first software stored in at least one first secured storage device and a second subsystem that boots and executes a second software stored in a second secured storage device, wherein a first secret key and a first stored signature corresponding to a first hash of the first software are stored in the at least one first secured storage, and wherein a second secret key, a second stored signature corresponding to the first hash of the first software, and a third stored signature corresponding to a first hash of the second software are stored in the at least one second secured storage device, the method comprising:

generating, by the first subsystem, the first hash of the first software;

transmitting, by the first subsystem, the generated first hash of the first software to the second subsystem;

performing, by the second subsystem, a first authenticity validation check on the first software using the received first hash of the first software; and generating, by the second subsystem, an error signal on a condition that the first authenticity validation check on the first software fails.

22. The method of claim 21, wherein:

generating, by the first subsystem, the first hash of the first software includes applying a first hash function to the first software, and performing, by the second subsystem, the first authenticity validation check on the first software includes generating a generated signature corresponding to the received first hash of the first software, comparing the generated signature with the second stored signature to generate a comparison result, and verifying an authenticity of the first software based on the comparison result.

23. The method of claim 21, further comprising:

performing, by the first subsystem, a second authenticity validation check on the first software by generating a generated signature corresponding to the generated first hash of the first software, comparing the generated signature with the first stored signature to generate a comparison result, and verifying an authenticity of the first software based on the comparison result.

24. The method of claim 21, further comprising:

performing, by the second subsystem, a first authenticity validation check on the second software by generating the first hash of the of the second software, generating a generated signature corresponding to the generated first hash of the second software, comparing the generated signature with the third stored signature to generate a comparison result, and verifying an authenticity of the second software based on the comparison result.

25. The method of claim 21, further comprising:

applying, by the first subsystem, a first hash function to generate hashes in the first subsystem;

applying, by the first subsystem, a first signature algorithm using the first secret key to generate signatures in the first subsystem;

applying, by the second subsystem, a second hash function to generate hashes in the second subsystem;

applying, by the second subsystem, a second signature algorithm using the second secret key to generate signatures in the second subsystem;

wherein the first hash function and the second hash function are different, the first signature algorithm and the second signature algorithm are different, and the first secret key and the second secret key have different key lengths.

26. The method of claim 25, further comprising:

performing, by the first subsystem, a second authenticity validation check on the first software by generating a first generated signature corresponding to the generated first hash of the first software using the first signature algorithm and the first secret key, comparing the first generated signature with the first stored signature to generate a first comparison result, and verifying an authenticity of the first software based on the first comparison result, wherein performing, by the second subsystem, the first authenticity validation check on the first software comprises generating a second generated signature corresponding to the received first hash of the first software using the second signature algorithm and the second secret key, comparing the second generated signature with the second stored signature to generate a second comparison result, and verifying an authenticity of the first software based on the second comparison result.

* * * * *